(12) United States Patent
Giron et al.

(10) Patent No.: US 11,007,753 B2
(45) Date of Patent: May 18, 2021

(54) LAMINATE INCLUDING PANELS AND A FILL MATERIAL BETWEEN THE PANELS

(71) Applicant: SAGE ELECTROCHROMICS, INC., Faribault, MN (US)

(72) Inventors: Jean-Christophe Giron, Edina, MN (US); Bryan D. Greer, Northfield, MN (US); Jacob Siegert, Faribault, MN (US); Pascal Reutler, Edina, MN (US); Jeremiah Lawson, Faribault, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 0 days.

(21) Appl. No.: 15/223,796

(22) Filed: Jul. 29, 2016

(65) Prior Publication Data

US 2017/0028685 A1    Feb. 2, 2017

Related U.S. Application Data

(60) Provisional application No. 62/198,500, filed on Jul. 29, 2015.

(51) Int. Cl.
*B32B 17/06* (2006.01)
*B32B 37/12* (2006.01)
(Continued)

(52) U.S. Cl.
CPC ............ *B32B 17/06* (2013.01); *B32B 3/18* (2013.01); *B32B 7/12* (2013.01);
(Continued)

(58) Field of Classification Search
CPC ........... B32B 17/06; B32B 37/12; B32B 7/12
(Continued)

(56) References Cited

U.S. PATENT DOCUMENTS

| 5,058,997 A | 10/1991 | Dickersen et al. |
| 5,281,302 A | 1/1994 | Lee et al. |

(Continued)

FOREIGN PATENT DOCUMENTS

| CN | 103941468 A | 7/2014 |
| CN | 104290377 A | 1/2015 |

(Continued)

OTHER PUBLICATIONS

Machine_English_Translation_JP_2005331572_A; Adachi, Isao; Method for Manufacturing Organic EL Device; Dec. 2, 2005; EPO; whole document (Year: 2005).*

(Continued)

*Primary Examiner* — Tahseen Khan
(74) *Attorney, Agent, or Firm* — Abel Schillinger, LLP; Robert N. Young (57) ABSTRACT

A laminate can include a first panel and including a first transparent substrate having a first refractive index. The laminate can further include a second panel and a third panel, each coupled to the first panel. The second panel includes a second transparent substrate having a second refractive index, and the third panel includes a third transparent substrate having a third refractive index. The laminate can further include a fill material disposed within a gap between the second and third panels and having a fill material refractive index. The fill material refractive index is within 0.09 of the second refractive index, the third refractive index, or a value between the second and third refractive indices. Coupling may be direct or may be achieved with an adhesive film. The fill material can help to reduce the likelihood of seeing seams between the second and third panels.

20 Claims, 4 Drawing Sheets

(51) Int. Cl.
*B32B 7/12* (2006.01)
*B32B 17/10* (2006.01)
*B32B 3/18* (2006.01)
*G02B 5/20* (2006.01)

(52) U.S. Cl.
CPC .. *B32B 17/10036* (2013.01); *B32B 17/10513* (2013.01); *B32B 17/10761* (2013.01); *B32B 37/12* (2013.01); *B32B 2255/26* (2013.01); *B32B 2307/30* (2013.01); *B32B 2307/402* (2013.01); *B32B 2307/412* (2013.01); *B32B 2307/418* (2013.01); *B32B 2307/732* (2013.01); *B32B 2607/00* (2013.01); *G02B 5/20* (2013.01)

(58) Field of Classification Search
USPC ........................................................ 428/212
See application file for complete search history.

(56) References Cited

U.S. PATENT DOCUMENTS

| | | | | |
|---|---|---|---|---|
| 6,011,642 | A * | 1/2000 | Vink | G02F 1/1523 204/192.26 |
| 6,277,523 | B1 * | 8/2001 | Giron | G02F 1/1525 429/304 |
| 6,590,332 | B1 * | 7/2003 | Park | H01J 11/12 313/484 |
| 6,624,570 | B1 * | 9/2003 | Nishio | H01J 1/72 313/498 |
| 8,824,038 | B2 | 9/2014 | Giron et al. | |
| 2002/0140348 | A1 | 10/2002 | Takeuchi et al. | |
| 2004/0218270 | A1 * | 11/2004 | Wang | G02B 5/1809 359/486.01 |
| 2005/0277063 | A1 * | 12/2005 | Wang | G02B 5/1857 430/311 |
| 2006/0028730 | A1 | 2/2006 | V. Varaprasad et al. | |
| 2006/0127830 | A1 | 6/2006 | Deng et al. | |
| 2007/0070276 | A1 | 3/2007 | Tan et al. | |
| 2009/0023297 | A1 * | 1/2009 | Salek | H01L 21/0276 438/758 |
| 2011/0025934 | A1 * | 2/2011 | McCarthy | G02F 1/132 349/20 |
| 2011/0045239 | A1 | 2/2011 | Takaya et al. | |
| 2011/0261429 | A1 | 10/2011 | Sbar et al. | |
| 2012/0099189 | A1 | 4/2012 | Bezzel et al. | |
| 2013/0295337 | A1 * | 11/2013 | Busman | G02F 1/1303 428/174 |
| 2014/0104667 | A1 | 4/2014 | Greer et al. | |
| 2014/0120242 | A1 * | 5/2014 | Wang | C09D 183/08 427/58 |
| 2015/0024184 | A1 * | 1/2015 | Bertolini | B32B 17/10045 428/217 |
| 2015/0286091 | A1 | 10/2015 | Zhang et al. | |

FOREIGN PATENT DOCUMENTS

| | | | |
|---|---|---|---|
| CN | 204109493 U | | 1/2015 |
| EP | 1245988 A2 | | 10/2002 |
| JP | 2001023771 A | * | 1/2001 |
| JP | 2001023771 A | | 1/2001 |
| JP | 2001100668 A | | 4/2001 |
| JP | 2004191608 A | | 7/2004 |
| JP | 2005331572 A | * | 12/2005 |
| JP | 2005331572 A | | 12/2005 |
| JP | 2006313198 A | | 11/2006 |
| JP | 2010127985 A | | 6/2010 |
| JP | 2011183792 A | | 9/2011 |
| WO | 2010119797 A1 | | 10/2010 |

OTHER PUBLICATIONS

Machine_English_Translation_JP_2004191608_A; Kamiyama, Isao; Display Device and Method of Manufacturing; Jul. 8, 2004; EPO; whole document (Year: 2004).*
Machine_English_Translation_JP_2001023771_A; Kotake, Ryota; et. al.; Planar Display Element; Jan. 26, 2001; EPO; whole document (Year: 2001).*
Wolf, Stanley, et al., "Silicon Processing for the VLSI Era". vol. 1, 1986, pp. 429-430.
Nov. 4, 2016 International Search Report issued in Application No. PCT/US2016/044743, 1 page.

* cited by examiner

LAMINATE INCLUDING PANELS AND A FILL MATERIAL BETWEEN THE PANELS

CROSS-REFERENCE TO RELATED APPLICATION

This application claims priority under 35 U.S.C. § 119(e) to U.S. Patent Application No. 62/198,500 entitled "Laminate Including Panels and a Fill Material Between the Panels and a Process of Forming the Laminate," by Giron et al., filed Jul. 29, 2015, which is assigned to the current assignee hereof and incorporated herein by reference in its entirety.

FIELD OF THE DISCLOSURE

The present disclosure is directed to laminates including panels, and more specifically to laminates that include panels and a fill material between the panels and processes of forming the same.

BACKGROUND

Transparent panels may be fabricated with one or more deposited layers. Many times, the size of the panels are limited by the size of substrates that the deposition equipment can process. Larger panels with deposited layers are desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Polymers include homopolymers and co-polymers. A homopolymer is formed from a single polymeric precursor, and a co-polymer is formed from different polymeric precursors.

In this specification, refractive indices are measured at 550 nm.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

A laminate can include a larger panel having and smaller panels coupled to the same side of the larger panel. A fill material can be used in a gap between the smaller panels. The fill materials can have a refractive index that is the same as or between the refractive indices of transparent substrates of the smaller panels. The refractive indices can help make seams between the smaller panels more difficult for humans to see and make the smaller panels appear as though they are parts of a single panel.

The configuration of the laminate can be useful when the sizes of panels are limited. For example, a tool used to process panels may limit the size of the panels. For example, a vapor deposition tool can have a deposition chamber that limits the size of the panels. Thus, panels that need to have a vapor deposited film may be limited in size, but panels that do not need a vapor deposited film may not be restricted in their size. Thus, the use of the fill material with better refractive index matching can allow for many smaller panels to be used with the larger panel with no or less visible seams. The laminate can have one or more other panels that used to increase the thickness for rigidity or for another purpose for a particular application.

Figure 1:
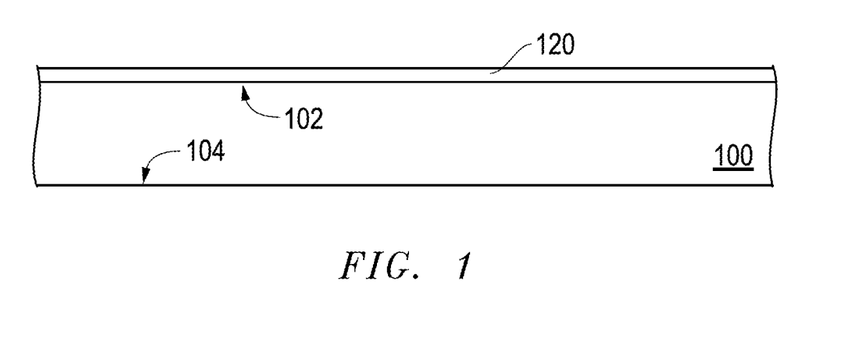
FIG. 1 includes an illustration of a cross-sectional view of a workpiece including a panel and an adhesive film.

FIG. 1 includes an illustration of a cross-section view of a panel 100 and an adhesive film 120. The panel 100 has major surfaces 102 and 104. The panel 100 includes a transparent substrate. The transparent substrate can include a glass substrate, a sapphire substrate, an aluminum oxynitride (AlON) substrate, a spinel substrate, or a transparent polymer. The transparent polymer can include a polyacrylate, a polyester, a polycarbonate, a polysiloxane, a polyether, a polyvinyl compound, another suitable class of transparent polymer, or a mixture thereof. In another embodiment, the transparent substrate can be a laminate including layers of the materials that make up the previously described transparent substrates.

In an embodiment, the transparent substrate can be a glass substrate that can include $SiO_2$ and one or more other oxides. Such other oxides can include $Al_2O_3$, an oxide of an alkali metal, an oxide of an alkaline earth metal, $B_2O_3$, $ZrO_2$, $P_2O_5$, ZnO, $SnO_2$, $SO_3$, $As_2O_2$, or $Sb_2O_3$. The transparent substrate may include a colorant, such as oxides of iron, vanadium, titanium, chromium, manganese, cobalt, nickel, copper, cerium, neodymium, praseodymium, or erbium, or a metal colloid, such as copper, silver, or gold, or those in an elementary or ionic form, such as selenium or sulfur.

The glass substrate is at least 50 wt % $SiO_2$. In an embodiment, the $SiO_2$ content is in a range of 50 wt % to 85 wt %. $Al_2O_3$ may help with scratch resistance, for example, when the major surface 104 is along an exposed surface of the laminate being formed. When present, $Al_2O_3$ content can be in a range of 1 wt % to 20 wt %. $B_2O_3$ can be usefully used to reduce both the viscosity of the glass and its thermal expansion coefficient. The $B_2O_3$ content may be no greater than 20 wt %, and in a particular embodiment, less than 15 wt %. Alkaline earth metals include magnesium, calcium, strontium, and barium. The oxides of an alkaline earth metal are useful for reducing the viscosity of the glass and facilitating fusion, without heavily penalizing the expansion coefficient. Calcium and magnesium have a relatively low impact on the density of the glass as compared to some of the other oxides. In large quantities, however, they could promote the devitrification of the glass. The total content of alkaline metal oxide may be no greater than 25 wt %, 20 wt %, or 15 wt %. Oxides of an alkali metal can reduce viscosity of the glass substrate and its propensity to devitrify. A drawback of alkali metal oxides is a significant increase in the thermal expansion coefficient. The total content of alkali metal oxides may be no greater than 8 wt %, 6 wt %, or 5 wt %. In some applications, the glass substrate is desired to be clear, and thus, the content of colorants is low. In a particular embodiment, the iron content is less than 200 ppm.

The panel 100 can include heat-strengthened glass, tempered glass, partially heat-strengthened or tempered glass, or annealed glass. "Heat-strengthened glass" and "tempered glass", as those terms are known in the art, are both types of glass that have been heat treated to induce surface compression and to otherwise strengthen the glass. Heat-treated glasses are classified as either fully tempered or heat-strengthened. In an embodiment, the glass substrate is tempered glass and has a surface compression of about 69 MPa or more and an edge compression of about 67 MPa or more. In another embodiment, the transparent substrate is heat-strengthened and has a surface compression in a range of 24 MPa to 69 MPa and an edge compression between 38 MPa and 67 MPa. The term "annealed glass" means glass produced without internal strain imparted by heat treatment and subsequent rapid cooling. Thus annealed glass only excludes heat-strengthened glass or tempered glass. The panel 100 can be laser cut.

The thickness of the panel 100 may depend on the desired application (e.g., residential architectural window, commercial architectural window, or another application) and desired thermal/structural properties. The panel 100 can have a thickness in a range of 2.3 mm to 25 mm. In a particular embodiment, panel 100 has a thickness in a range of 6 mm to 15 mm.

The panel 100 can have a relative large area along the major surfaces 102 and 104. In an embodiment, the panel 100 may not be processed in a vapor deposition tool, and therefore, is not restricted by the size of a deposition chamber of the vapor deposition tool. Along either or both major surfaces, a panel can be in the shape of a rectangle, triangle or another polygon, a circle, an ellipse, oblong, or another suitable shape. In the embodiment as illustrated, the panel 100 can have a length of at least 5 m, at least 11 m, at least 15 m, at least 20 m, or even longer, and a width at least 1.5 m, at least 2.0 m, at least 3.0 m, at least 3.5 m, or wider. In a particular embodiment, the panel 100 has a size of 18 m×3 m.

When forming the laminate, the process can include adhering the adhesive film 120 to the major surface 102 of the panel 104. The adhesive film 120 can include a polyvinyl butyral, polyvinyl acetate, polyurethane, another suitable adhesive, or any mixture thereof. The thickness of the adhesive film 120 may be no greater than 2 mm, and in an embodiment, no greater than 1 mm. The layer 120 can have substantially same areal dimensions or trimmed to substantially the same areal dimensions as the panel 100. For example, substantially the same areal dimensions can be within 5%, 3%, or 1% of each other.

Figure 2:
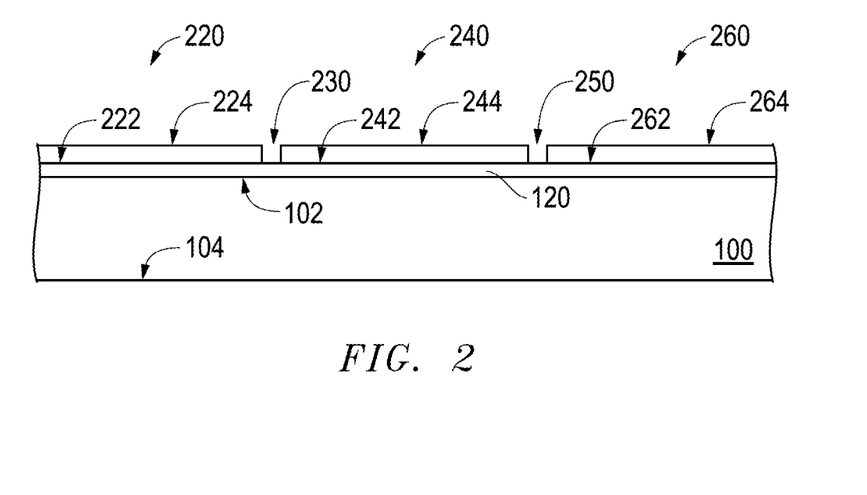
FIG. 2 includes illustrations of the workpiece of FIG. 1 after panels are adhered to the adhesive film.

The process can further include coupling major surfaces 222, 242, and 262 of panels 220, 240, and 260 to the major surface 102 of the panel 100. In a particular embodiment, the coupling can be accomplished with the adhesive film 120, such coupling includes adhering the major surfaces 222, 242, and 262 to the adhesive film 120. In the embodiment as illustrated, the adhesive film 120 is adhered to the panel 100 before the panels 220, 240, and 260 are adhered to the adhesive film 120. In another embodiment, the panels 220, 240, and 260 are adhered to the adhesive film 120 before the panel 100 is adhered to the adhesive film 120.

The panels 220, 240, and 260 include transparent substrates as previously described with respect to the transparent substrate of the panel 100. Many times, the properties of the transparent substrate of the panel 100 will be different from the transparent substrates of the panels 220, 240, and 260. The coefficients of thermal expansion (CTEs) may or may not be significant when the compositions of the transparent substrates are different. For a symmetric configuration, such as when the panels 220, 240, and 260 are between two panels that are substantially the same as the panel 100, a large difference in CTEs between the panels 220, 240, and 260, and the outer panels can be tolerated. If the construction of the laminate is asymmetric about the panels 220, 240, and 260, the difference in CTEs may be more significant. In such an asymmetric configuration, the CTE of the transparent substrate of the panel 100 may be within $18 \times 10^{-7}/° C.$, $12 \times 10^{-7}/° C.$, or $6 \times 10^{-7}/° C.$ of the CTE of any or all of the transparent substrates of the panels 220, 240, and 260. As used herein, the term "within" is to be construed in either direction, so within reflects an absolute value of the difference.

In an embodiment, the transparent substrate of the panel 100 has a composition different from each of the transparent substrates for the panels 220, 240, and 260. Some exemplary materials for the transparent substrate can include soda-lime float glass, borofloat glass, boroaluminosilicate glass, aluminosilicate glass, another suitable glass or the like. Any one or more of the panels 220, 240, and 260 can be laser cut and have an edge strength of at least 30 MPa, at least 60 MPa, or at least 75 MPa. In an embodiment, any one or more of the panels 220, 240, and 260 can be heat-strengthened glass or tempered (thermally or chemically). In a further embodiment, any one or more of the panels 220, 240, and 260 can have an annealed glass substrate. After reading this specification, skilled artisans will be able to select the composition of the transparent substrates of the panels 220, 240, and 260 to meet their particular desires or needs in view of a particular application. The transparent substrates of the panels 220, 240, and 260 may have the same composition or different compositions. In a particular embodiment, the transparent substrates of the panels 220, 240, and 260 can have the same composition. In another particular embodiment, the CTEs of the transparent substrates of the panels 220, 240, and 260 can be within $2 \times 10^{-7}/°$ C. of one another.

The panels 220, 240, and 260 can be thinner than the panel 100. In an embodiment, each of the panels 220, 240, and 260 have a thickness in a range of 10 microns to 5 mm, and in a particular embodiment, in a range of 0.5 mm to 2.5 mm. In another embodiment, the panels 220, 240, and 260 can be thicker than 5 mm and may be as thick or thicker than the panel 100.

Any one or more of the panels 220, 240, and 260 can have one or more vapor deposited films on either or both major surfaces of any one or more of the panel. The area of the major surfaces of the panels 220, 240, and 260 may be limited to a size that can be processed within a vapor deposition tool. The dimensions of major surface of a panel may be no greater than 3.0 m in one direction and no greater than 1.5 m in an orthogonal direction. The selection of the particular dimensions for the panels 220, 240, and 260 may depend on the dimensions of the panel 100. If the panel 100 has dimensions of 10 m×2 m, each of the panels 220, 240, and 260 can have dimensions of 2.5 m×1.0 m. Other panels having similar dimensions to the panels 220, 240, and 260 can be used to cover other portions of the panel 100.

The panels 220, 240, and 260 are placed on the adhesion film 120, such that major surfaces 222, 242, and 262 contact the adhesive film 120. The panel 240 does not abut the panels 220 and 260. The edges of the panels are not perfect, and if the panel 240 contacted the panels 220 and 260, small gaps would be present and include air or another gas having a refractive index different as compared to the gas panels 220, 240, and 260. A precision pick-and-place tool can be used to place the panels 220, 240, and 260 on the adhesion film 120. If a precision pick-and-place tool is not available, spacers can be used to maintain uniform spacing between the panels 220, 240, and 260. The gaps between the panel 240 and each of the panels 220 and 260 is sufficient to allow a fill material to be used between the gaps. In an embodiment, the gap has a width no greater than 25 mm, no greater than 13 mm, no greater than 8 mm, no greater than 5 mm, or no greater than 3 mm, and in another embodiment, the gap has a width greater than 0 micron and may be at least 2 microns, at least 11 microns, at least 0.2 mm, at least 0.6 mm, or at least 1.1 mm. In an embodiment, the width of the gap depends on the thickness on the thicknesses of the panels 220, 240 and 260. In a particular embodiment, the panels 220, 240, and 260 have thicknesses less than 100 microns, and thus, the gap can be close to but greater than 0 micron, such as greater than 2 microns or greater than 11 microns.

Figure 3:
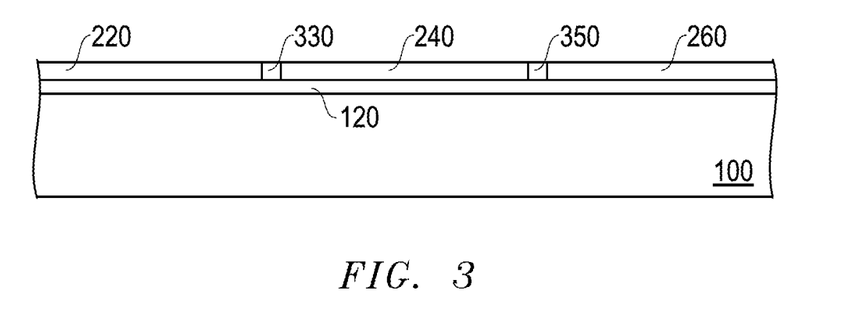
FIG. 3 includes illustrations of the workpiece of FIG. 2 after filling gaps between panels in accordance to an embodiment.

The process can further include filling the gaps between the panels 220, 240, 260 with a fill material 330 and 350, as illustrated in FIG. 3. In other to reduce the visibility of seams between the panels 220, 240, and 260, the fill material may have a refractive index that is within 0.09, 0.05, 0.03, 0.02, or 0.01 of the refractive indices of any one or more of the transparent substrates of the panels 220, 240, and 260, or a value between any two refractive indices of such transparent substrates. In an embodiment, the fill material 330 and 350 is in the form of a solid material that is placed in the gaps between the panels 220, 240, and 260. In an embodiment where the panels 220, 240, and 260 are relatively thick (for example, at least 5 mm thick), the fill material 330 and 350 may be in the form of strips that are inserted into the gaps. In a particular embodiment, the fill material 330 and 350 may be the same or different.

In another embodiment, filling the gaps can be performed by filling the gap with a liquid material and solidifying the fill material 330. In a particular embodiment, the liquid material can be a polymeric precursor, and solidifying the liquid material includes polymerizing the polymeric precursor to form a polymer. The solidification can be performed by curing the polymeric precursor using a thermal curing technique, exposure to ultraviolet light, or a combination thereof. An aquarium, mold, dam, or other fixture may be used to help contain the liquid during the process.

Figure 4:
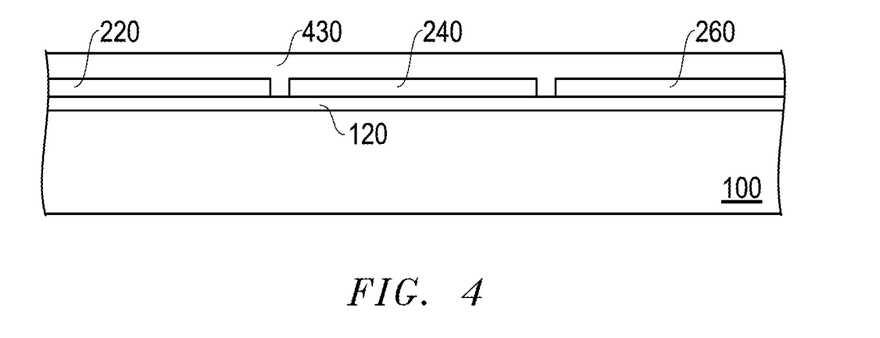
FIG. 4 includes illustrations of the workpiece of FIG. 2 after filling gaps between panels in accordance with an alternative embodiment.

In an embodiment, the fill material 330 and 350 can include a polyacrylate, a polyester, a polycarbonate, a polysiloxane, a polyether, a polyvinyl compound, another suitable class of transparent polymer, or a mixture thereof. In a further embodiment as illustrated in FIG. 4, a fill material 430 fills the gaps and overlies the panels 220, 240, and 260.

In a particular embodiment, the fill material includes a polyacrylate. The polyacrylate can be a poly(methylacrylate), a poly(ethylacrylate), a poly(propylacrylate), a poly(vinylacrylate), a poly(methyl methacrylate), a poly(ethyl methacrylate), a poly(propyl methacrylate), a poly(vinyl methacrylate), or a mixture thereof. In another embodiment, the polyacrylate can be a copolymer of two, three, or more acrylic precursors. An acrylic precursor can include methyl acrylate, ethyl acrylate, propyl acrylate, vinyl acrylate, methyl methacrylate, ethyl methacrylate, propyl methacrylate, or vinyl methacrylate. A copolymeric polyacrylate can include poly(methyl methacrylate vinyl methacrylate). In one particular embodiment, the fill material comprises poly(methyl methacrylate). In one other particular embodiment, the fill material consists essentially of poly(methyl methacrylate). In one further embodiment, the fill material comprises poly(vinyl methacrylate). In one other particular embodiment, the fill material consists essentially of poly(vinyl methacrylate). An exemplary acrylic resin includes Uvekol S™-brand and UvekolS15™-brand resins available from Allnex Belgium SA of Brussels, Belgium.

In one embodiment, the fill material includes a polyester. The polyester can include a polyethylene terephthalate (PET), a polyethylene napthalate, a polybutylene terephthalate, a polyethylene isonaphthalate, or any combination thereof. In one particular embodiment, the transparent polymer comprises PET. In another particular embodiment, the fill material consists essentially of PET.

In one embodiment, the fill material includes a polyether. The polyether can be polyethylene ether, poly propylene ether, polybutylene ether, or any combination thereof. In another embodiment, the polyether can be a copolymer of two, three, or more polyols. For example, the polyether can be a copolymer of 1,2-ethanediol, 1,2-propanediol, 1,3-propanediol, 1,2-butanediol, 1,3-butanediol, or 1,4-butanediol.

In one embodiment, the fill material can be a polyvinyl compound. The polyvinyl compound can be a polyvinyl alcohol, a polyvinyl ester, a polyvinyl acetate, or any combination thereof. In one embodiment, the polyvinyl acetate can include polyvinyl butyral. In one particular embodiment, the transparent polymer consists essentially of polyvinyl butyral. In another embodiment, the polyvinyl compound can be a copolymer of a vinyl alcohol derivative and an olefin. The vinyl alcohol derivative can be vinyl acetate. In one embodiment, the polyvinyl compound can be poly (ethylene vinyl acetate).

After reading this specification, skilled artisans will be able to select a composition of the fill material and fill technique that works well for their particular applications.

Figure 5:
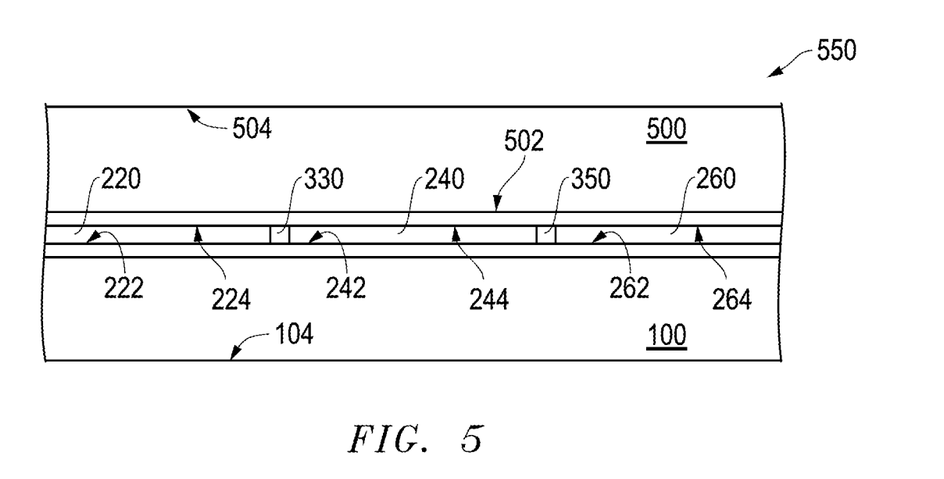
FIG. 5 includes illustrations of the workpiece of FIG. 5 after another adhesive film and another panel are attached to the laminate.

The process further includes coupling major surfaces 224, 244, and 264 of the panels 220, 240, and 260 to a major surface 502 of a panel 500, as illustrated in FIG. 5. The workpiece as illustrated in FIG. 3 is used in performing the process as illustrated in FIG. 5. The panel 500 can include any one or more of the materials and thicknesses as described with respect to the panel 100. In a particular embodiment, the panel 500 and the panel 100 have the same composition, and the panel 500 has the same nominal thickness as the panel 100. In another embodiment, the panel 500 has a different composition, a different nominal thickness, or both as compared to the panel 100. As the CTEs and thicknesses of the panels 100 and 500 become more similar, the difference in CTE between (1) the panels 220, 240, and 260 and (2) the panels 100 and 500 may be larger, as compared to another embodiment in which the panels 100 and 500 have CTEs, thicknesses, or both that become more different.

The coupling of the panels 220, 240, and 260 and the panel 500 can be performed using a technique as previously described with respect to coupling of the panel 100 and the panels 220, 240, and 260. An adhesive film 520 can be used and has a composition as previously described with respect to the adhesive film 120. In an embodiment, the adhesive film 520 can have the same composition and thickness as the adhesive film 120, and in another embodiment, the adhesive film 520 has a different composition, a different nominal thickness, or both as compared to the adhesive film 120. The adhesive film 520 may be adhered to the panel 500 before the adhesive film is adhered to the panels 220, 240, and 260, or the adhesive film 520 may be adhered to the panels 220, 240, and 260 before the adhesive film 520 is adhered to the panel 500.

The adhesive films 120 and 520 may be in the form of a solid sheet, for example, a pressure sensitive adhesive, or may be in the form of a liquid, such as a silicone rubber, an epoxy, or the like. One or both of the adhesive films 120 and 520 can be clear or may include a colorant.

The workpiece 550 can be a finished article or may be further processed to include one or more additional panels or films or include electrical components, trim, or other finishing components. For example, the laminate can include three, five, or nearly any number of relatively thick panels, such as panels 100 and 500. Other panels similar to the panels 220, 240, and 260 may also be included. After reading this specification, skilled artisans will be able to determine the number and types of panels used and to fabricate a laminate for their particular needs or desires. Lamination processes are further described in a publication entitled "Uvekol® Glass Laminating System; Instructions For the Production of Laminated Glazing Units Using Uvekol A and S Resin" by Allnex Belgium SA of Brussels, Belgium, which is incorporated herein in its entirety.

If needed or desired, the process can include treating an edge of the panel 220, 240, 260 or any combination thereof, wherein filling the gap is performed after treating the edge. When the treatment includes a coating, the coating may be formed by a chemical vapor process (atmospheric, low pressure with or without plasma assistance), a sol gel process, or another suitable coating process.

In an embodiment, treating the edge can include forming an adhesion promoter along an edge of the panel 220, 240, 260 or any combination thereof. The adhesion promoter can help the fill material can improve adhesion between the edges and the fill material. The adhesion promoter may be formed on the edges before or after the panels 220, 240, and 260 are coupled to the panel 100. The composition of the adhesion promoter can depend on the composition of the transparent substrates of the panels 220, 240, and 260 and the fill material 330, 350, or 430. In a particular embodiment in which the transparent substrates include an inorganic material, such as glass, and the fill material is an organic material, the adhesion promoter can include hexamethyldisilizane.

The adhesion promoter may be intended to be formed only along the edges or along the edges and at least one of the major surfaces of each of the panels 220, 240, and 260. If the adhesion promoter is only to be formed along the edges, tape or another protective film may be applied to the major surfaces before the adhesion promoter is formed along the edges. After the adhesion promoter is formed, the tape or other protective film may be removed from the major surfaces. If a small residual amount of adhesion promoter is present on any of the major surfaces, typically adjacent to the edges, such residual amount may be removed. In another embodiment the adhesion promoter may be intended to be formed along at least one major surface of each of the panels 220, 240, and 260. Such an embodiment may be useful when the fill material 430 is also formed over the major surfaces of the panels 220, 240, and 260, as previously described with respect to FIG. 4.

In an embodiment, the treatment can include adding a matching index coating or a stack of coatings or a coating gradient to reduce the residual visible seam even further. In a particular embodiment, a stack of layers are formed in an order such that the refractive index of a particular coating closest to the edges of the panels 220, 240, and 260 has a refractive index closer to the refractive index of the fill material, as compared to any other coating in the stack, and another particular coating closest to the fill material has a refractive index closer to the refractive index of the fill material, as compared to any other coating in the stack.

In a further embodiment, the treatment can include dehydrating the edges to reduce the amount of water adsorbed on the edges or other exposed surfaces of the panels 202, 240, 260. Dehydration may be performed using an oven, an autoclave (atmospheric or evacuated) or the like.

Figure 6:
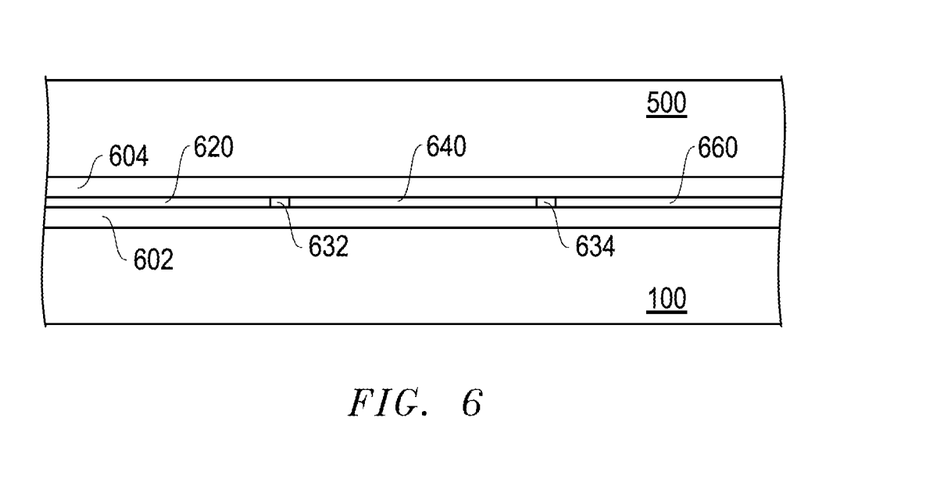
FIGS. 6 and 7 include illustrations of cross-sectional views of a panel where an adhesive film fills gaps between panels.
Figure 7:
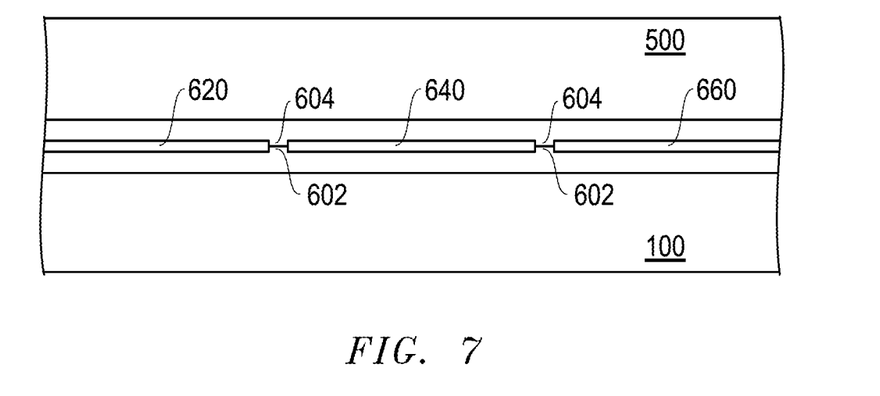

Another embodiment can allow for adhesive to flow into the gaps between thin panels due to heat used during the lamination process. FIG. 6 includes an illustration of a cross-sectional view of a workpiece that includes the panels 100 and 500 as previously described. The panels 620, 640, and 660 can have the compositions and properties of the panels 220, 240, and 260. In this particular embodiment, each of the panels 620, 640, and 660 have a thickness in a range of 25 microns to 100 microns. An adhesive film 602 is disposed between the panel 100 and the panels 620, 640, and 660, and an adhesive film 604 is disposed between the panel 500 and the panels 620, 640, and 660. The adhesive films 602 and 604 can have any of the compositions and thicknesses as described with respect to the adhesive films 120 and 520. The adhesive films 602 and 604 are solid, and thus, gaps 632 and 634 are between the panels 620, 640, and 660. During lamination, one or both of the adhesive films 602 and 604 can flow into and fill the spaces 632 and 634, as illustrated in FIG. 7.

Figure 8:
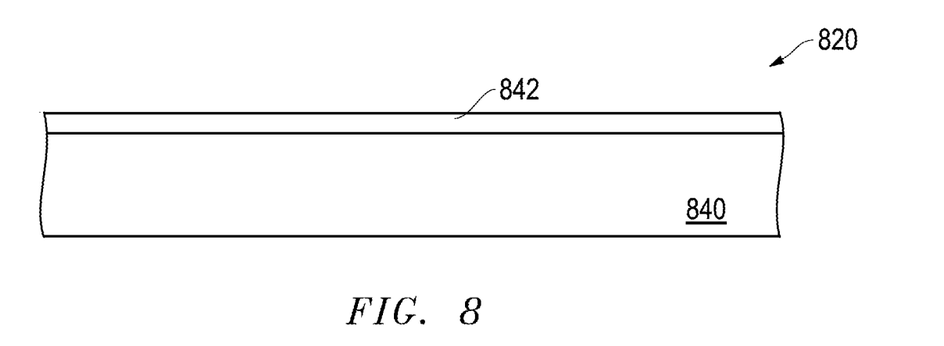
FIG. 8 includes illustration of a cross-sectional view of a panel after a vapor deposited film is deposited over a transparent substrate.

Attention is now directed to details of a panel that can include a vapor deposited film. As previously described with respect to the panels 220, 240, and 260, any one or more of the panels can include one or more vapor deposited films. FIG. 8 includes an illustration of a portion of a cross-sectional view of a portion of a panel 820 that includes a transparent substrate 840 and a vapor deposited film 842. The composition, thickness, and size of the transparent substrate 840 can be that same as described with any of the transparent substrates for the panels 220, 240, and 260. The transparent substrate 840 can be placed into a vapor deposition tool, and the vapor deposited film 842 is deposited over the transparent substrate 840. The vapor deposited film 840 can be or part of a reflective film, a solar control film, a low-ε film (emissivity <0.2), a color filter film, a frit, an electrically active device, or any combination thereof. An example of an electrically active device can include a transparent display, a liquid crystal display, an SPD, a photovoltaic device, a light emitting display (organic or inorganic), electrochromic device, or the like. If needed or desired, an exterior side of 840 can also be coated with an anti-condensation film, self cleaning film, or that like that can be used in place of or in conjunction with the electronic device. Any of the vapor-deposited films and electrically active devices as described with respect to the panel 840 may be used with any one or more of the panels 220, 240, 260, 620, 640, 660, and similar panels as described hereinafter.

Figure 9:
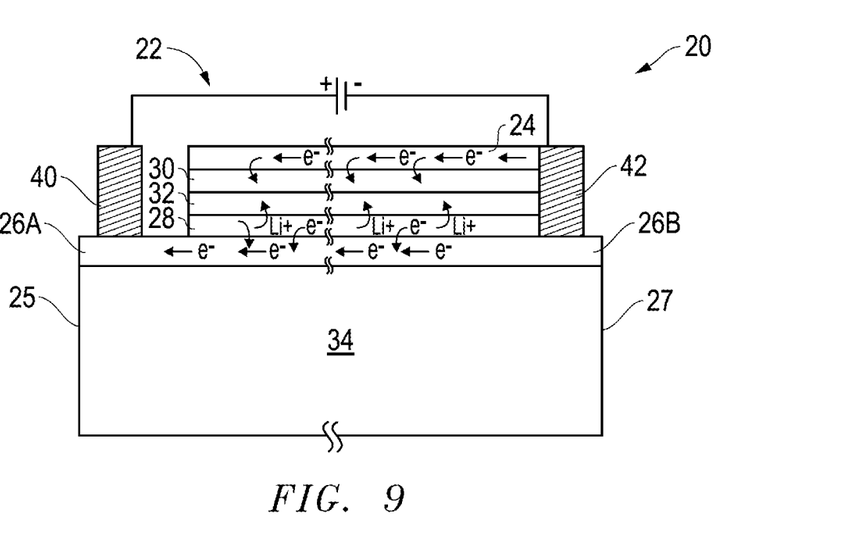
FIG. 9 includes an illustration of a cross-sectional view of a panel that includes an electrochromic device.

FIG. 9 includes an illustration of an electrochromic device over a transparent substrate 34. The electrochromic device includes isolated transparent conductive layer regions 26A and 26B, a counter electrode layer 28, a solid ion conductive layer 32, an electrochromic layer 30 and a transparent conductive layer 24. The layers 26, including regions 26A and 26B, 28, 30, 32, and 24 can be vapor deposited. In another embodiment, the relative positions of the electrochromic layer 30 and the counter electrode layer 28 may be interchanged. Further, the device 20 can includes a bus bar 40 which is in contact only with the conductive layer region 26A, and a bus bar 42 which may be formed on the conductive layer region 26B and is in contact with the conductive layer 24. The bus bars 40 and 42 can be formed by printing a conductive ink or using another technique. The voltage source 22 and wires connected to the bus bars 40 and 42 may or may not be part of the panel.

When the voltage source 22 is operated to apply an electrical potential across the bus bars 40, 42, electrons, and thus a current, flows from the bus bar 42, across the transparent conductive layer 24 and into the electrochromic layer 30. Further, ions flow from the counter electrode layer 28, through the ion conductive layer 32, and to the electrochromic layer 30, and a charge balance is maintained by electrons being extracted from the counter electrode layer 28, and then being inserted into the electrochromic layer 30 via the external circuit.

Figure 10:
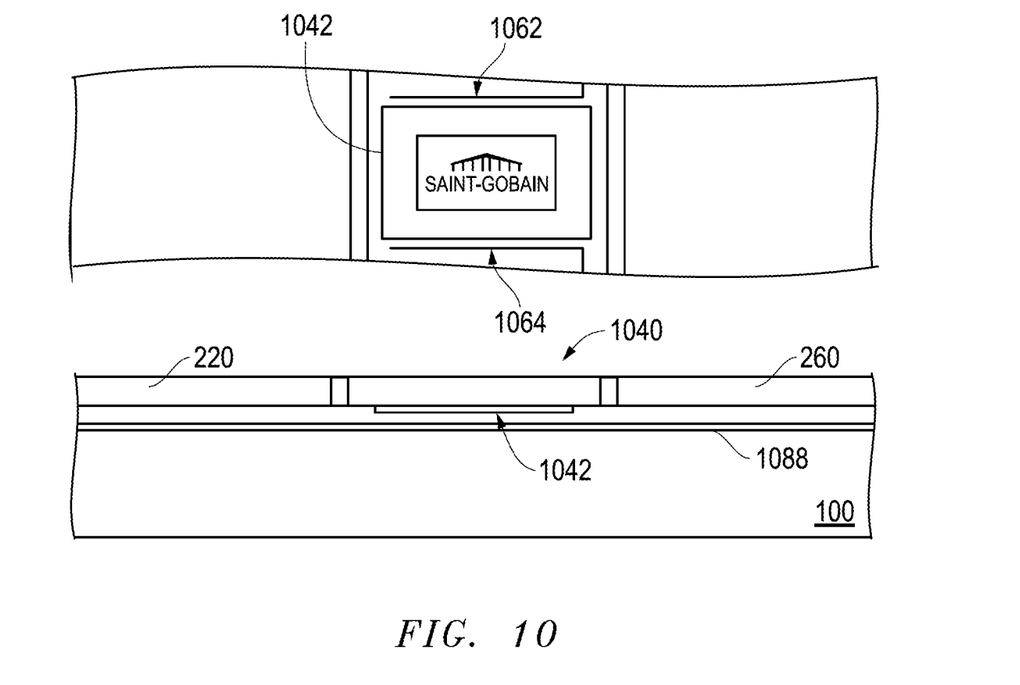
FIG. 10 includes illustrations of top and cross-sectional views of a laminate including a display and an optional film.

FIG. 10 includes a film 1088 disposed between the panel 100 and the panels 220, 1040, and 260. The film can be a reflective film, a solar control film, a low-ε film (emissivity <0.2), a color filter film, an anti-condensation film, or the like. The film 1088 may be attached as a sheet or applied in the form of a liquid that is subsequently cured to form a solid. In the embodiment, the film 1088 is along the major surface 102 of the panel 100. In another embodiment, the film 1088 may be disposed along a major surface of a different panel, such as along the major surface 502 of the panel 500.

In another embodiment, the film 1088 may not be present, or more than one film may be used. In an embodiment, a panel may have an electrochromic device, and another panel may not have any device or vapor deposited film. Even in its bleached state, the electrochromic device may have a slight yellow coloration, whereas the other panel may be clear. A pink film may be adjacent to the panel with the electrochromic device, so that the combination of pink and yellow colors (which looking through the laminate) appears to be gray. Another film having a gray color may be adjacent to the panel that does not have the electrochromic device. Thus, when viewing the laminate at a location through the panel with the electrochromic device and at another location through the other panel without an electrochromic device, both will appear to be gray when the electrochromic device is in its bleached state.

In another embodiment, the film 1082 may not be present, or more than one film may be used. In an embodiment, a panel may have an electrochromic device, and another panel may not have any device or vapor deposited film. Even in its bleached state, the electrochromic device may have a slight yellow coloration, whereas the other panel may be clear. A pink film may be adjacent to the panel with the electrochromic device, so that the combination of pink and yellow colors (which looking through the laminate) appears to be gray. Another film having a gray color may be adjacent to the panel that does not have the electrochromic device. Thus, when viewing the laminate at a location through the panel with the electrochromic device and at another location through the other panel without an electrochromic device, both will appear to be gray when the electrochromic device is in its bleached state.

Figure 11:
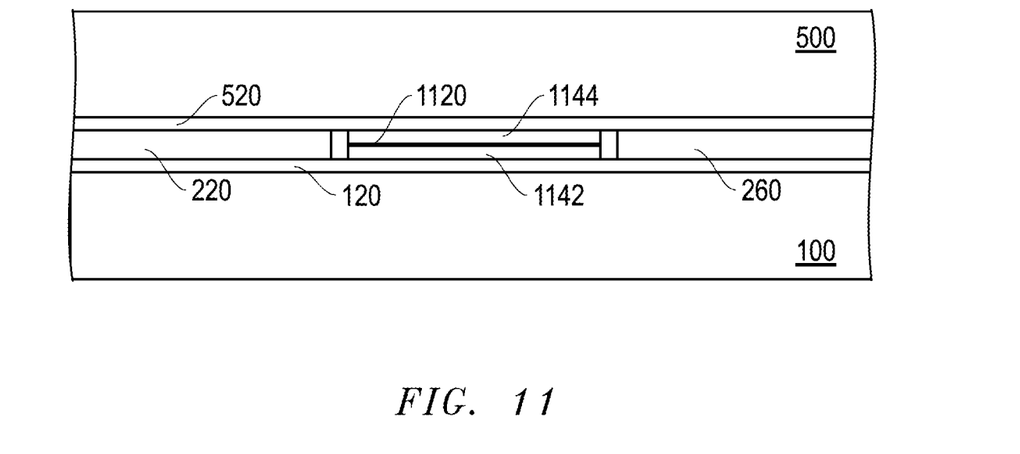
FIG. 11 includes an illustration of a cross-sectional view of a laminate that includes a laminate laterally adjacent to other panels.

FIG. 11 includes an illustration of a cross sectional view of a laminate. In the embodiment as illustrated, the panel 240 is replaced by a laminate that includes panels 1142 and 1144 and an adhesive film 1120 between the panels 1142 and 1144. The panels 1142 and 1144 can be any of the transparent substrates, films, or active devices of the previously described panels 240, 640, 20, or 840. Thus, laminated mother panels can be with other laminated mother panels or other panels and using index matching materials to make the seam between the panels as invisible as reasonably possible.

In an application, the laminate can be flat. In another application, the laminate may be curved or have some other non-planar shape. The larger panels may be bent into a shape before the laminate is formed. In another embodiment, the smaller panels may be bent into the shape in addition to the larger panels. Such bending of the panels may be performed before the panel is attached to another panel. In a further embodiment, the laminate may be bent into a shape when some or all of the panels of the laminate are present.

Embodiments as described herein include laminates that have a large surface area. Some applications, such as architectural windows for commercial building, may require windows that are greater than 4 m (more than the height of a typical story of a building) tall. The techniques as described above allow large area laminates to be formed even when processing or other fabricating equipment limit the size of panels that are used to form the laminate. For example, a panel may need a film that is vapor deposited, yet, a deposition chamber of a vapor deposition tool may limit the size of the panel that can be processed. A different tool or other reason may limit the surface area of the panel. The laminate can include a larger panel with smaller panels coupled to the larger panel. A fill material between the smaller panels can have a refractive index that this is the same as or between the refractive indices of transparent substrates of the smaller panels. By tailoring the refractive indices, seams between the smaller panels may not be visible or less visible to the human eye.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1

A laminate comprising:
a first panel having a first major surface and including a first transparent substrate having a first refractive index;
a second panel having a first major surface and including a second transparent substrate having a second refractive index;
a third panel having a first major surface and including a third transparent substrate having a third refractive index; and
a fill material disposed within a gap between the second and third panels and having a fill material refractive index, wherein:
the first major surfaces of second and third panels are coupled to the first major surface of the first panel; and
the fill material refractive index is within 0.09 of the second refractive index, the third refractive index, or a value between the second and third refractive indices.

Embodiment 2

The laminate of Embodiment 1, further comprising a first adhesive film disposed between the first glass panel and each of the second and third glass panels.

Embodiment 3

A process of forming a laminate comprising:
providing a first panel including a first transparent substrate having a first major surface and a first refractive index;
coupling a first major surface of a second panel to the first major surface of the first panel, wherein the second panel includes a second transparent substrate having a second refractive index;
coupling a first major surface of a third panel to the first major surface of the first panel, wherein the third panel includes a third transparent substrate having a third refractive index; and
filling a gap between the second and third panels with a fill material having a fill material refractive index, wherein the fill material refractive index is within 0.09 of the second refractive index, the third refractive index, or a value between the second and third refractive indices.

Embodiment 4

The process of Embodiment 3, wherein filling the gap is performed after coupling the first major surfaces of the second and third panels to the first major surface of the first panel.

Embodiment 5

The process of Embodiment 3, wherein filling the gap comprises filling the gap with a liquid material and solidifying the liquid material.

Embodiment 6

The process of Embodiment 5, wherein the liquid material includes a polymeric precursor, and solidifying the liquid material comprises polymerizing the polymeric precursor to form a polymer.

Embodiment 7

The process of Embodiment 6, wherein the polymeric precursor comprises a methyl acrylate, an ethyl acrylate, a propyl acrylate, a vinyl acrylate, a methyl methacrylate, an ethyl methacrylate, a propyl methacrylate, a vinyl methacrylate, or any mixture thereof.

Embodiment 8

The process of Embodiment 3, wherein filling the gap comprises placing a solid material in the gap between the second and third panels.

Embodiment 9

The process of Embodiment 3, wherein coupling the second panel and coupling the third panel comprises adhering a first adhesive film to a first major surface of the first panel; adhering a first major surface of the second panel to the first adhesive film; and adhering a first major surface of the third panel to the first adhesive film.

Embodiment 10

The process of Embodiment 3 further comprising coupling a first major surface of a fourth panel to a second major surface of the second panel; and coupling the first major surface of the fourth panel to a second major surface of the third panel, wherein a first adhesive film is disposed between the first panel and each of the second and third panels, a second adhesive film is disposed between the fourth panel and each of the second and third panels, and filling the gap between the second and third panels comprises flowing the first adhesive film, the second adhesive film, or both the first and second adhesive films into the gap.

Embodiment 11

The process of Embodiment 10, wherein each of the second and third panels has a thickness in a range of 25 microns to 100 microns.

Embodiment 12

The process of Embodiment 3, further comprising treating an edge of the second panel, the third panel, or both the second and third panels, wherein filling the gap is performed after treating the edge.

Embodiment 13

The laminate or the process of any one of the preceding Embodiments, wherein the fill material refractive index is within 0.09, 0.05, 0.03, 0.02, or 0.01 of each of the second and third refractive indices.

Embodiment 14

The laminate or the process of any one of the preceding Embodiments, wherein the fill material includes include a polyacrylate, a polyester, a polycarbonate, a polysiloxane, a polyether, a polyvinyl compound, or any mixture thereof.

Embodiment 15

The laminate or the process of any one of the preceding Embodiments, wherein the second panel, the third panel, or each of the second and third panels includes a vapor deposited film.

Embodiment 16

The laminate or the process of any one of the preceding Embodiments, wherein the second panel comprises an active device.

Embodiment 17

The laminate or the process of Embodiment 16, wherein the third panel does not include an active device.

Embodiment 18

The laminate or the process of Embodiment 16, wherein the active device includes an electrochromic device comprising an electrochromic layer, a counter electrode layer, and a solid ion-conducting layer disposed between the electrochromic and counter electrode layers.

Embodiment 19

The laminate or the process of any one of the preceding Embodiments, wherein the laminate further comprises a first film that includes a reflective film, a solar control film, a low-ε film, a first color filter film, an anti-condensation film, or any combination thereof.

Embodiment 20

The laminate or the process of Embodiment 19, further comprising a second color filter film, wherein the first film is a first color filter film that is part of the second panel or disposed between the first and second panels, the second color filter film that is part of the third panel or disposed between the first and third panels, and the first color filter film and the second color filter film filter different colors.

Embodiment 21

The laminate or the process of Embodiment 20, wherein when viewing the laminate at a first location through the first color filter film and the second panel and at a second location through the second color filter film and the third panel, the laminate appears to be gray at the first and second locations.

Embodiment 22

The laminate or the process of any one of the preceding Embodiments, wherein the first transparent substrate has a first coefficient of thermal expansion, the second transparent substrate has a second coefficient of thermal expansion, the third transparent substrate has a third coefficient of thermal expansion, and the first coefficient of thermal expansion is within $18 \times 10^{-7}/°$ C., $12 \times 10^{-7}/°$ C., or $6 \times 10^{-7}/°$ C. of each of the second and third coefficients of thermal expansion.

Embodiment 23

The laminate or the process of Embodiment 22, wherein the second and third coefficients of thermal expansion are within $2 \times 10^{-7}/°$ C. of each other.

Embodiment 24

The laminate or the process of any one of the preceding Embodiments, wherein the first transparent substrate is a tempered or heat strengthened glass panel, the second transparent substrate is not a tempered or heat strengthened glass panel, the third transparent substrate is not a tempered or heat strengthened glass panel, or any combination thereof.

Embodiment 25

The laminate or the process of any one of the preceding Embodiments, wherein the first major surface of the first panel has an area that is greater than a combined area of the first major surfaces of the second and third panels.

Embodiment 26

The laminate or the process of any one of the preceding Embodiments, wherein the first adhesive film comprises polyvinyl butyral, polyvinyl acetate, or polyurethane.

Embodiment 27

The laminate or the process of any one of the preceding Embodiments, wherein a difference in refractive indices between the first refractive index and either or both of the second and third refractive indices is greater than differences in refractive indices between the fill material index and each of the second and third refractive indices.

Embodiment 28

The laminate or the process of any one of the preceding Embodiments, further comprising a fourth panel having a first major surface, wherein each of the second and third panels has a second major surface opposite the first major surface, and the first major surface of the fourth panel is coupled to the second major surfaces of the second and third panels.

Embodiment 29

The laminate or the process of Embodiment 28, wherein an area of the first major surface of the first panel is within 10%, within 5%, within 2%, or within 1% of an area of the first major surface of the fourth panel.

Embodiment 30

The laminate or the process of Embodiment 28 or 29, wherein the fourth panel includes a fourth transparent substrate having a fourth refractive index, and a difference in refractive indices between the first and fourth refractive indices is less than differences in refractive indices between the fill material refractive indices and each of the second and third refractive indices.

Embodiment 31

The laminate or the process of any one of Embodiments 28 to 30, further comprising a second adhesive film disposed between first major surface of the fourth panel and each of the second major surfaces of the second and third panels.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A laminate comprising:
   a first panel having a first major surface and including a first transparent substrate having a first refractive index;
   a second panel having a first major surface and including a second transparent substrate having a second refractive index;
   a third panel having a first major surface and including a third transparent substrate having a third refractive index;
   a first adhesive film;
   a transparent fill material disposed within a gap between the second and third panels and having a fill material refractive index; and
   an adhesion promoter only along the edge of each of the first panel, second panel, and third panel, wherein:
   the first adhesive film is disposed between the major surface of the first panel and the major surface of the second panel;
   the first adhesive film is disposed between the major surface of the first panel and the major surface of the third panel;
   the first major surface of the second panel is coupled to the first major surface of the first panel;
   the first major surface of the third panel is coupled to the first major surface of the first panel;
   the fill material refractive index is within 0.09 of the second refractive index, the third refractive index, or a value between the second and third refractive indices;
   the first transparent substrate has a first coefficient of thermal expansion;
   the second transparent substrate has a second coefficient of thermal expansion;
   the third transparent substrate has a third coefficient of thermal expansion; and
   the first coefficient of thermal expansion is within $18 \times 10^{-7}/°$ C. of each of the second and third coefficients of thermal expansion.

2. The laminate of claim 1, wherein the fill material includes include a polyacrylate, a polyester, a polycarbonate, a polysiloxane, a polyether, a polyvinyl compound, or any mixture thereof.

3. The laminate of claim 1, wherein the second panel, the third panel, or each of the second and third panels includes a vapor deposited film.

4. The laminate of claim 1, wherein the second panel comprises an active device.

5. The laminate of claim 4, wherein the active device includes an electrochromic device comprising an electrochromic layer, a counter electrode layer, and a solid ion-conducting layer disposed between the electrochromic and counter electrode layers.

6. The laminate of claim 1, wherein the laminate further comprises a first film that includes a reflective film, a solar control film, a low-ε film, a first color filter film, an anti-condensation film, or any combination thereof.

7. The laminate of claim 6, further comprising a second color filter film, wherein:
   the first film is a first color filter film that is part of the second panel or disposed between the first and second panels;
   the second color filter film that is part of the third panel or disposed between the first and third panels;
   the first color filter film and the second color filter film filter different colors; and
   when viewing the laminate at a first location through the first color filter film and the second panel and at a second location through the second color filter film and the third panel, the laminate appears to be gray at the first and second locations.

8. The laminate of claim 1, wherein the second and third coefficients of thermal expansion are within $2 \times 10^{-7}/°$ C. of each other.

9. The laminate of claim 1, wherein:
   the first transparent substrate is a tempered or heat strengthened glass panel;
   the second transparent substrate is not a tempered or heat strengthened glass panel;
   the third transparent substrate is not a tempered or heat strengthened glass panel; or
   any combination thereof.

10. The laminate of claim 1, wherein the first major surface of the first panel has an area that is greater than a combined area of the first major surfaces of the second and third panels.

11. The laminate of claim 1, wherein a difference in refractive indices between the first refractive index and either or both of the second and third refractive indices is greater than differences in refractive indices between the fill material index and each of the second and third refractive indices.

12. The laminate of claim 1, further comprising a fourth panel having a first major surface, wherein:
   each of the second and third panels has a second major surface opposite the first major surface;
   the first major surface of the fourth panel is coupled to the second major surface of the second panel; and
   the first major surface of the fourth panel is coupled to the second major surface of the third panel.

13. The laminate of claim 12, wherein an area of the first major surface of the first panel is within 10% of an area of the first major surface of the fourth panel.

14. The laminate of claim 12, wherein:
   the fourth panel includes a fourth transparent substrate having a fourth refractive index; and
   a difference in refractive indices between the first and fourth refractive indices is less than differences in refractive indices between the fill material refractive indices and each of the second and third refractive indices.

15. The laminate of claim 14, further comprising a second adhesive film, wherein:
   the second adhesive film is disposed between first major surface of the fourth panel and the second major surface of the second panel; and
   the second adhesive film is disposed between first major surface of the fourth panel and the second major surface of the third panel.

16. A laminate comprising:
   a first panel having a first major surface and including a first transparent substrate having a first refractive index;
   a second panel having a first major surface and including a second transparent substrate having a second refractive index, wherein the second panel includes an electrochromic device comprising:
   an electrochromic layer;
   a counter electrode layer; and
   a solid ion-conducting layer disposed between the electrochromic and counter electrode layers;
   a third panel having a first major surface and including a third transparent substrate having a third refractive index;
   a transparent fill material disposed within a gap between the second and third panels and having a fill material refractive index, wherein the fill material is a film; and
   an adhesion promoter only along the edge of each of the first panel, second panel, and third panel,
   wherein:
      the first major surface of the second and panel is coupled to the first major surface of the first panel;
      the first major surface of the third and panel is coupled to the first major surface of the first panel;
      the fill material refractive index is within 0.09 of the second refractive index, the third refractive index, or a value between the second and third refractive indices, and wherein the second refractive index is different than the third refractive index;
      the first transparent substrate has a first coefficient of thermal expansion;
      the second transparent substrate has a second coefficient of thermal expansion;
      the third transparent substrate has a third coefficient of thermal expansion; and
      the first coefficient of thermal expansion is within $18 \times 10^{-7}/°$ C. of each of the second and third coefficients of thermal expansion.

17. The laminate of claim 16, wherein the gap between the second and third panels has a width between 2 microns and 3 mm.

18. The laminate of claim 16, wherein the fill material is disposed within the gap between the second and third panels and overlies the second and third panels.

19. The laminate of claim 16, wherein the adhesion promoter along one or more edges of the laminate comprises hexamethyldislizane.

20. The laminate of claim 16, wherein the first transparent substrate is greater than 4 m.

* * * * *

UNITED STATES PATENT AND TRADEMARK OFFICE
CERTIFICATE OF CORRECTION

| | |
|---|---|
| PATENT NO. | : 11,007,753 B2 |
| APPLICATION NO. | : 15/223796 |
| DATED | : May 18, 2021 |
| INVENTOR(S) | : Giron et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 106 days.

Signed and Sealed this
Thirteenth Day of December, 2022

*Katherine Kelly Vidal*

Katherine Kelly Vidal
*Director of the United States Patent and Trademark Office*